(12) United States Patent
Szapiel et al.

(10) Patent No.: US 7,072,540 B1
(45) Date of Patent: Jul. 4, 2006

(54) METHOD OF ASSEMBLING A MULTIPLEXER/DEMULTIPLEXER APPARATUS TO ACCOUNT FOR MANUFACTURING VARIATIONS IN THE THIN-FILM OPTICAL FILTERS

(75) Inventors: Stanislaw Szapiel, Port McNicoll (CA); James R. Whitty, Midland (CA)

(73) Assignee: Raytheon Company, Waltham, MA (US)

(*) Notice: Subject to any disclaimer, the term of this patent is extended or adjusted under 35 U.S.C. 154(b) by 129 days.

(21) Appl. No.: 10/421,284

(22) Filed: Apr. 22, 2003

(51) Int. Cl.
    *G02B 6/28* (2006.01)
(52) U.S. Cl. ............................. 385/24; 385/34; 385/14
(58) Field of Classification Search .................. 385/24
    See application file for complete search history.

(56) References Cited

U.S. PATENT DOCUMENTS

| 4,244,045 A | 1/1981 | Nosu et al. |
| 4,482,994 A | 11/1984 | Ishikawa |
| 5,583,683 A | 12/1996 | Scobey |
| 5,859,717 A | 1/1999 | Scobey et al. |
| 5,905,827 A | 5/1999 | Naganuma et al. |
| 6,008,920 A | 12/1999 | Hendrix |
| 6,418,250 B1 * | 7/2002 | Corbosiero et al. ............ 385/24 |

* cited by examiner

*Primary Examiner*—John R. Lee
*Assistant Examiner*—Phillip A. Johnston
(74) *Attorney, Agent, or Firm*—William C. Schubert; Karl A. Vick

(57) ABSTRACT

The thin-film optical filters and transmitted-light collimators of a multistage optical multiplexer/demultiplexer apparatus are assembled by locating the thin-film optical filters so that an incident light beam is incident upon and reflected sequentially from each thin-film optical filter to the next thin-film optical filter, and orienting each thin-film optical filter to produce a respective angle-of-incidence of the incident light beam on the thin-film optical filter so that a desired transmitted light beam is transmitted therethrough with a maximum intensity. The transmitted-light collimators are positioned to receive the respective transmitted light beams with minimal insertion loss. The respective steps of positioning are performed independently of, but after, the respective steps of orienting for each multiplexer/demultiplexer stage.

17 Claims, 3 Drawing Sheets

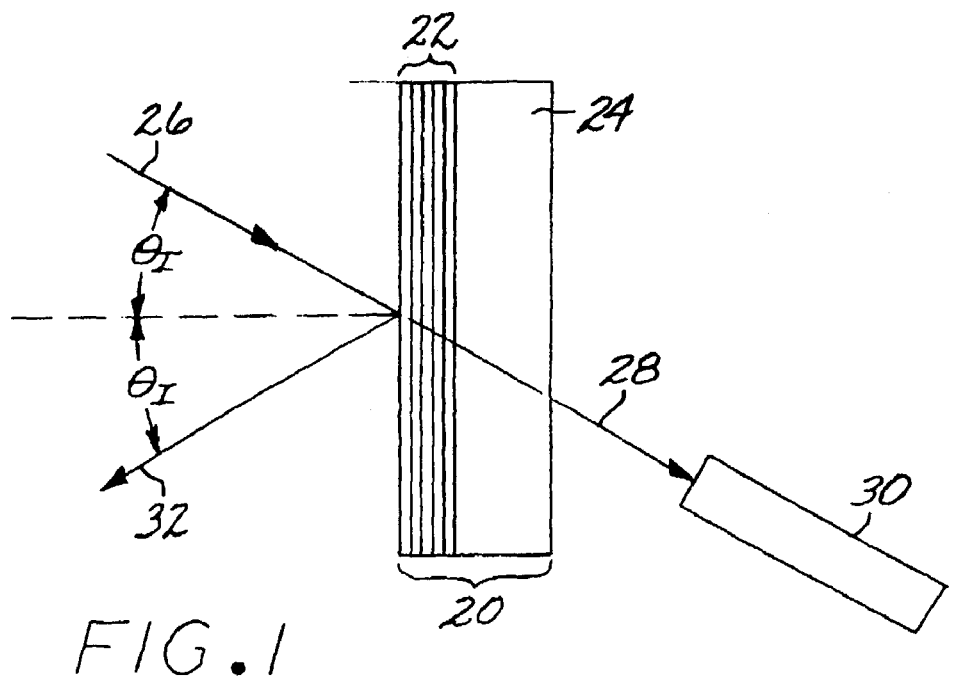
FIG. 1
FIG. 2
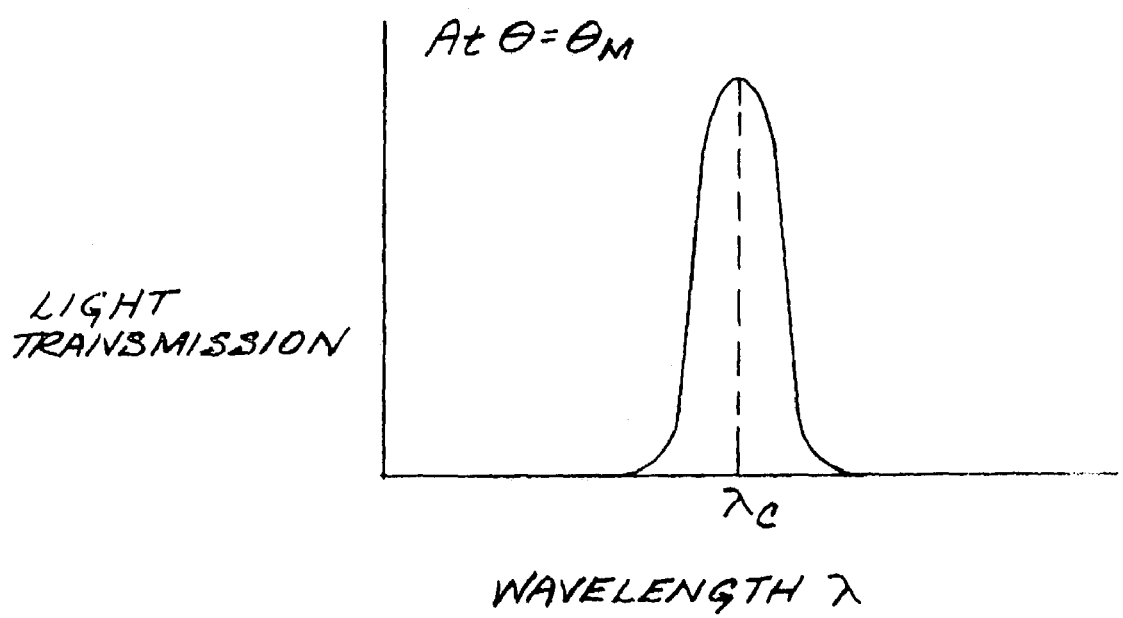

METHOD OF ASSEMBLING A MULTIPLEXER/DEMULTIPLEXER APPARATUS TO ACCOUNT FOR MANUFACTURING VARIATIONS IN THE THIN-FILM OPTICAL FILTERS

This invention relates to optical apparatus, and more particularly, to the assembly of a multiplexer/demultiplexer apparatus that utilizes thin-film optical filters and optical collimators.

BACKGROUND OF THE INVENTION

Optical communications systems encode information onto a light beam at a transmitting location, transmit the light beam through free space or a medium such as an optical fiber, and then decode the information from the light beam at a receiving location. A great deal of information may be encoded onto the light beam due to its high frequency. Additional information may be transmitted by encoding it onto a second light beam having a slightly different wavelength than the first light beam, mixing the two light beams together at the transmitting location (or several different transmitting locations), transmitting the mixed light beam, separating the two light beams at the receiving location (or several different receiving locations), and then decoding the two sets of information from the two light beams. The amount of information that may be transmitted is increased yet further by using additional light beams in a similar manner, with all of the light beams at slightly different wavelengths.

To implement such an optical communications system, the two or more light beams having slightly different wavelengths must be mixed together (i.e., combined into a single beam for transmission), a process termed wavelength-division multiplexing, and later separated apart from the single transmitted beam, a process termed wavelength-division demultiplexing. The mixing and separating operations are reciprocal, so that the same type of apparatus may be used in a reciprocal manner, to perform both operations. The apparatus used to perform the multiplexing and demultiplexing is termed a multiplexer/demultiplexer apparatus, which may be shortened to a "mux/demux apparatus."

One well-established mux/demux apparatus accomplishes the mixing and separation with thin-film optical filters. When a light beam is incident upon the thin-film optical filter at a precisely defined angle of incidence, the thin-film optical filter passes light within a very narrow spectral pass band characteristic of the thin-film optical filter, and reflects all other wavelengths of light. This property is used to mix light beams together or to separate them, as required in the mux/demux apparatus. Many variations of mux/demux apparatus use the thin-film optical filters in the light communications systems.

However, the cost of such systems is substantially greater than desired, due to the low manufacturing yield of suitable thin-film optical filters. The thin-film optical filters are made by depositing a sequence of typically over one hundred, and sometimes as many as several hundred, very thin layers onto a substrate in a pattern and thickness that, taken together, produces the desired pass band characteristic. In a typical manufacturing operation, the sequence of layers is deposited onto a large substrate, which is then diced to produce a number of the individual thin-film optical filters. It is often found that, with manufacturing variations in this complex processing, only a small fraction of the final thin-film optical filters satisfy the specifications that must be met for the mux/demux apparatus to be functional as designed, when the mux/demux apparatus is assembled using conventional techniques.

There is therefore a need for an improved approach to mux/demux apparatus and assembly approach that results in a satisfactory sequence of mixing or separating the light beams, at a lower cost than presently possible. The present invention fulfills this need, and further provides related advantages.

SUMMARY OF THE INVENTION

The present invention provides a method for assembling an optical multiplexer/demultiplexer (mux/demux) apparatus that utilizes thin-film optical filters and light collimators. The method utilizes a stepwise assembly approach that permits the use of thin-film optical filters that are not perfectly formed according to the design values. That is, thin-film optical filters may be used even though these filters are somewhat off-specification due to manufacturing variations. With conventional assembly approaches, these off-specification thin-film optical filters would be unusable, at least for the mux/demux apparatus. The present method thereby improves the effective yield of usable thin-film optical filters in the overall manufacturing process leading from the fabrication of the thin-film optical filters to the final mux/demux apparatus.

In accordance with the invention, a method for assembling an optical multiplexer/demultiplexer apparatus comprises the steps of furnishing a component set comprising a first thin-film optical filter and a second thin-film optical filter, and a first transmitted-light collimator and a second transmitted-light collimator. The thin-film optical filters are oriented by the steps of first locating the first thin-film optical filter so that a first incident light beam is incident upon the first thin-film optical filter, thereafter first orienting the first thin-film optical filter to produce a first angle-of-incidence of the first incident light beam on the first thin-film optical filter so that a desired first-transmitted light beam is transmitted therethrough with a maximum intensity and a second incident light beam is reflected from the first thin-film optical filter, thereafter second locating the second thin-film optical filter so that the second incident light beam is incident upon the second thin-film optical filter, and thereafter second orienting the second thin-film optical filter to produce a second angle-of-incidence of the second incident light beam on the second thin-film optical filter so that a desired second-transmitted light beam is transmitted therethrough with a maximum intensity and a third incident light beam is reflected from the second thin-film optical filter. The transmitted-light collimators are positioned by the steps of first positioning the first transmitted-light collimator to receive the first-transmitted light beam with minimal insertion loss, wherein the step of first positioning is performed independently of, but after, the step of first orienting, and second positioning the second transmitted-light collimator to receive the second-transmitted light beam with minimal insertion loss, wherein the step of second positioning is performed independently of, but after, the step of second orienting.

This approach is operable where the apparatus is subsequently used as a multiplexer, where light beams are mixed together, or where the apparatus is used as a demultiplexer, where light beams are separated from the previously mixed light beam.

The method preferably includes the additional steps of fixing the thin-film optical filters and transmitted-light collimators in place, performed after they are located and oriented. In a typical case, a support base is furnished, either in a form of a flat plate or a more complex structure. The thin-film optical filters and transmitted-light collimators are fixed to the support base by any operable approach.

In most instances, the component set includes an input collimator that is fixed in place, a first transmitted-light collimator and a second transmitted-light collimator. The first incident light beam is directed through the input collimator. The first incident light beam serves as an alignment standard to which the other elements of the component set are aligned. The input collimator is therefore initially fixed in space and remains fixed for the remainder of the assembly and alignment, preferably by permanently fixing it to the support base, to fix the orientation of the first incident light beam. After the first thin-film optical filter is oriented, the first transmitted-light collimator is positioned to receive the first-transmitted light beam with minimal insertion loss. After the second thin-film optical filter is oriented, the second transmitted-light collimator is positioned to receive the second-transmitted light beam with minimal insertion loss. After the thin-film optical filters and light collimators are positioned, they are fixed in place.

There may be, and typically are, additional multiplexer/demultiplexer stages in the form of additional pairs of thin-film optical filters and associated transmitted-light collimators. They are located, oriented, positioned, and fixed in a similar sequential manner. Thus, for example, a third multiplexer/demultiplexer stage includes a third thin-film optical filter, and a third transmitted-light collimator. The third thin-film optical filter is oriented by the steps of third locating the third thin-film optical filter so that the third incident light beam is incident upon the third thin-film optical filter, and thereafter third orienting the third thin-film optical filter to produce a third angle-of-incidence of the third incident light beam on the third thin-film optical filter so that a desired third-transmitted light beam is transmitted therethrough with a maximum intensity and a fourth incident light beam is reflected from the third thin-film optical filter. The third transmitted-light collimator is thereafter positioned by the steps of third positioning the third transmitted-light collimator to receive the third-transmitted light beam with minimal insertion loss, wherein the step of third positioning is performed independently of, but after, the step of third orienting. The third thin-film optical filter and the third transmitted-light collimator are fixed in place.

As noted, there may be additional thin-film optical filters and associated transmitted-light collimators arranged as respective multiplexer/demultiplexer stages, e.g., fourth, fifth, sixth, etc. multiplexer/demultiplexer stages. They are sequentially positioned and fixed in the manner described above, with the positioning of each multiplexer/demultiplexer stage being responsive to the positioning of the preceding stage(s).

Many multistage multiplexer/demultiplexer designs using thin-film optical filters are known in the art, and are manufactured as designed. The designs are specified in terms of the positions and orientations of the thin-film optical filters under the assumption that each of the thin-film optical filters is almost perfectly manufactured to the required tight specifications. For example, it is customary to specify for 100 GHz Dense Wavelength Division Multiplexing (DWDM) that the filters shall work at incidence angles of 1.8+/−0.1 degrees, and that the center wavelength offset error at 1.8 degrees shall not exceed +/−0.05 nm. Practical experience shows, however, that a substantial fraction of the actually manufactured thin-film optical filters are close to the design specifications, but suffer from slight deviations from the specifications in respect to the angle of incidence required to achieve the transmission of the pass band wavelength. The actually manufactured thin-film optical filters also vary in their geometry, with a slight inclination between the front and back faces of the thin-film optical filters, termed a "wedge error". In manufacturing practice, the wedge error varies between the individual ones of the thin-film optical filters. All of these slightly deviating thin-film optical filters would not be usable in the conventional assembly approaches, resulting in a low manufacturing yield of suitable thin-film optical filters. The conventional assembly approaches specify the required locations and orientations of the thin-film optical filters in the final optical mux-demux apparatus. The thin-film optical filters that do not function at these specified locations and orientations cannot be used. Thus, the conventional assembly approaches do not address this problem of nonuniformity in the as-manufactured thin-film optical filters, but instead essentially require that almost-perfect filters be used. In current production practice, the acceptable thin-film optical filters are sorted out and used in the multiplexer/demultiplexer assemblies, while the remainder are discarded or used in less-critical applications. The result is a low manufacturing yield of thin-film optical filters suitable for multiplexer/demultiplexer apparatus, and accordingly a high cost of each operable multiplexer/demultiplexer apparatus.

In the present approach, by contrast, the assembly procedure takes each thin-film optical filter for what it is, whether perfect or imperfect, and then locates and orients it according to its angle-of-incidence pass band characteristics. The associated transmitted-light collimator is positioned as required to achieve a low insertion loss. The beam reflected from the thin-film optical filter is used as the incident light beam to the next thin-film optical filter, which is similarly positioned and oriented as required to its incident light beam. The result is an optical multiplexer/demultiplexer apparatus that uses a much higher fraction of the available operable thin-film optical filters, substantially increasing the manufacturing yield and reducing the costs of the multiplexer/demultiplexer apparatus.

This approach of positioning the transmitted-light collimator independently of the locating and orienting of its associated thin-film optical filter results in slight variations in the geometry of the multiplexer/demultiplexer apparatus assembly. Consequently, the geometry of each assembly may be, and usually is, slightly different from the geometry of every other assembly, although the overall layouts are similar. However, the slight irregularity allows the use of thin-film optical filters that would not be usable if the assembly were required to adhere to a rigid, precisely regular geometry for every multiplexer/demultiplexer apparatus. The variations in geometry do not typically pose an obstacle for the multiplexer/demultiplexer apparatus, because the light inputs and outputs are all via flexible optical fibers connected to the collimators.

The present approach thus utilizes a sequential aligning approach proceeding from the first multiplexer/demultiplexer stage to the last multiplexer/demultiplexer stage. However, this approach permits the production of subassemblies. For example, the first-third multiplexer/demultiplexer stages may be prepared as a first subassembly in the manner described, and the fourth-sixth multiplexer/demultiplexer stages may be prepared as a second subassembly in the manner described. Then the input light beam of the second subassembly is aligned to the output light beam of the first subassembly. This subassembly approach is within the scope of the present invention.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic view of a thin-film optical filter;

FIG. 2 are schematic graphs of transmission as a function of angle of incidence at a specific angle of incidence;

DETAILED DESCRIPTION OF THE INVENTION

Figure 3:
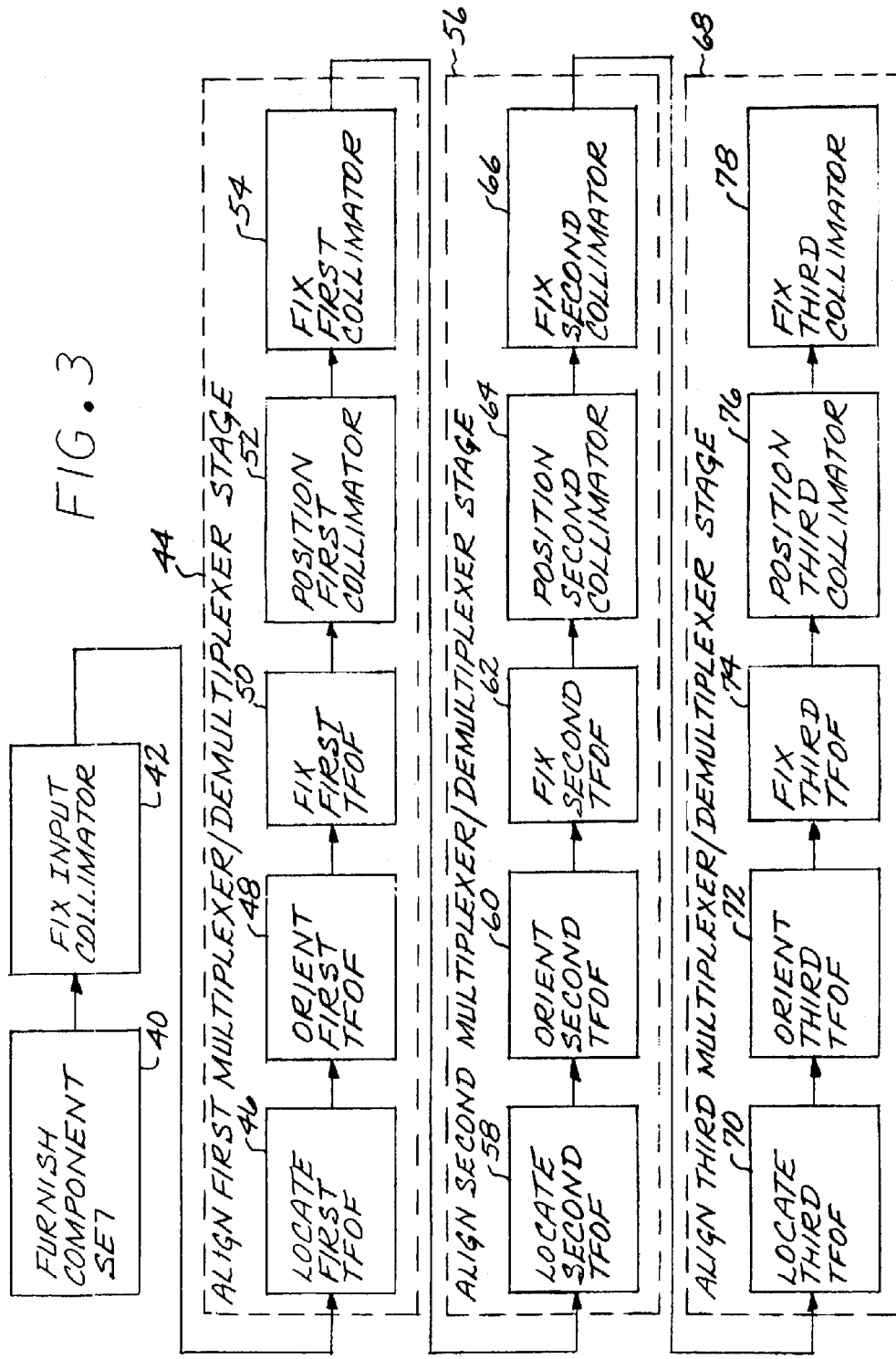
FIG. 3 is a block flow diagram of a method for practicing the approach of the invention.

The present approach is prompted by the characteristics of thin-film optical filters, which are illustrated in FIGS. 1–2. A thin-film optical filter 20 is formed by depositing a number of optical layers 22 on a transparent substrate 24. In a typical case, there are over 100 of the optical layers 22, and often as many as 200–300 optical layers 22. An incident light beam 26 is directed at an angle of incidence $\theta_1$ against the substrate 24. A transmitted light beam 28 having a pass band about a center wavelength $\lambda_C$ passes through the thin-film optical filter 20 and is typically received by a transmitted-light collimator 30. A reflected light beam 32 having all other wavelengths of the incident light beam 26 is reflected from the thin-film optical filter 20 at the angle of incidence $\theta_1$. Such thin-film optical filters 20 and their manufacture are known in the art.

In such thin-film optical filters 20, the transmitted wavelength is tuned as the angle of incident $\theta_1$ changes. Let $\lambda_O$ be the center wavelength of light transmitted by the filter when $\theta_1=0$ (i.e., the beam is perpendicular to the filter). If the filter is then rotated so that $\theta_1 \neq 0$, the transmitted center wavelength $\lambda_C$ tunes according to the equation:

$$\lambda_C(\theta_1)=\lambda_O(1-G \sin^2\theta_1)^{1/2},$$

where G is a dimensionless coefficient characteristic for a given stack of layers 22 that compose the thin-film optical filter 20. Note that $\lambda_C < \lambda_O$, and the sign of the angle $\theta_1$ does not matter. The present assembly method is based on this tunability property of such thin-film filters.

When the thin-film optical filter 20 is manufactured, the transmission of the center wavelength $\lambda_C$ and pass band are experimentally measured to occur at a incident light angle $\theta_M$. Ideally, $\theta_M$ would be precisely equal to a specified incident light angle $\theta_S$ that is specified as the angle of incidence $\theta_1 +/- \delta$, where $\delta$ is a very small fraction of $\theta_1$ allowed for an error, in the thin-film optical filter that is to be manufactured. If that were always the case, the present invention would not be required. But in practice it is found that $\theta_M$ often does not equal the specified incident light angle $\theta_S$, and typically deviates from $\theta_S$ by some amount. This deviation may be due to any of a number of factors, such as small variations in the composition and/or thickness of one or more of the optical layers 22, or variations across the wafer that is first manufactured and then diced to form the individual thin-film optical filters.

It has been the practice in prior approaches for the assembly of optical multiplexer/demultiplexer apparatus to require that $\theta_M$ must equal $\theta_S$, and then to select for use only those thin-film optical filters that meet this criterion. Many otherwise-acceptable thin-film optical filters must therefore be discarded or diverted to other, less demanding uses.

The present approach is based in part upon the relaxation of the requirement that $\theta_M$ must equal $\theta_S$. Instead, the assembly of the optical multiplexer/demultiplexer is custom assembled to accommodate the individual value of $\theta_M$ for each thin-film optical filter.

The assembly is also customized to precisely position the transmitted-light collimators. Each thin-film optical filter is ideally a perfectly planar device, with the front surface perfectly parallel to the back surface. In practice, however, each thin-film optical filter as actually manufactured is slightly wedge-shaped, with the front surface and back surface slightly angularly oriented to each other by an angle that varies from filter to filter. The wedge error thus varies from thin-film optical filter to thin-film optical filter. This wedge variability results in a slight angular variation, from filter to filter, in the angle at which the transmitted light leaves the thin-film optical filter. The wedge variability error results in an increase, sometimes a severe increase, in the insertion loss for the light coupled to the respective transmitted-light collimators, relative to a fixed-position input collimator.

In conventional practice that requires an identical geometry for every multiplexer/demultiplexer apparatus, a thin-film optical filter must be discarded if its wedge angle is too great. In the present approach, in which the geometry is allowed to vary slightly from apparatus to apparatus, after the thin-film optical filter is oriented for maximum intensity of the desired transmitted wavelength, the transmitted-light optical collimator is positioned as necessary for minimum insertion loss.

By this approach of relaxing the requirement of regularity of geometry of the assembly and custom locating and positioning both the thin-film optical filter and the transmitted-light collimator for each individual stage of the multiplexer/demultiplexer apparatus in sequence, optimum performance is achieved even though there is a production variation in the performance and/or geometry of the thin-film optical filters. Production yields increase because thin-film optical filters that were unusable in conventional multiplexer/demultiplexer apparatus assemblies can be used in the present approach.

Figure 4:
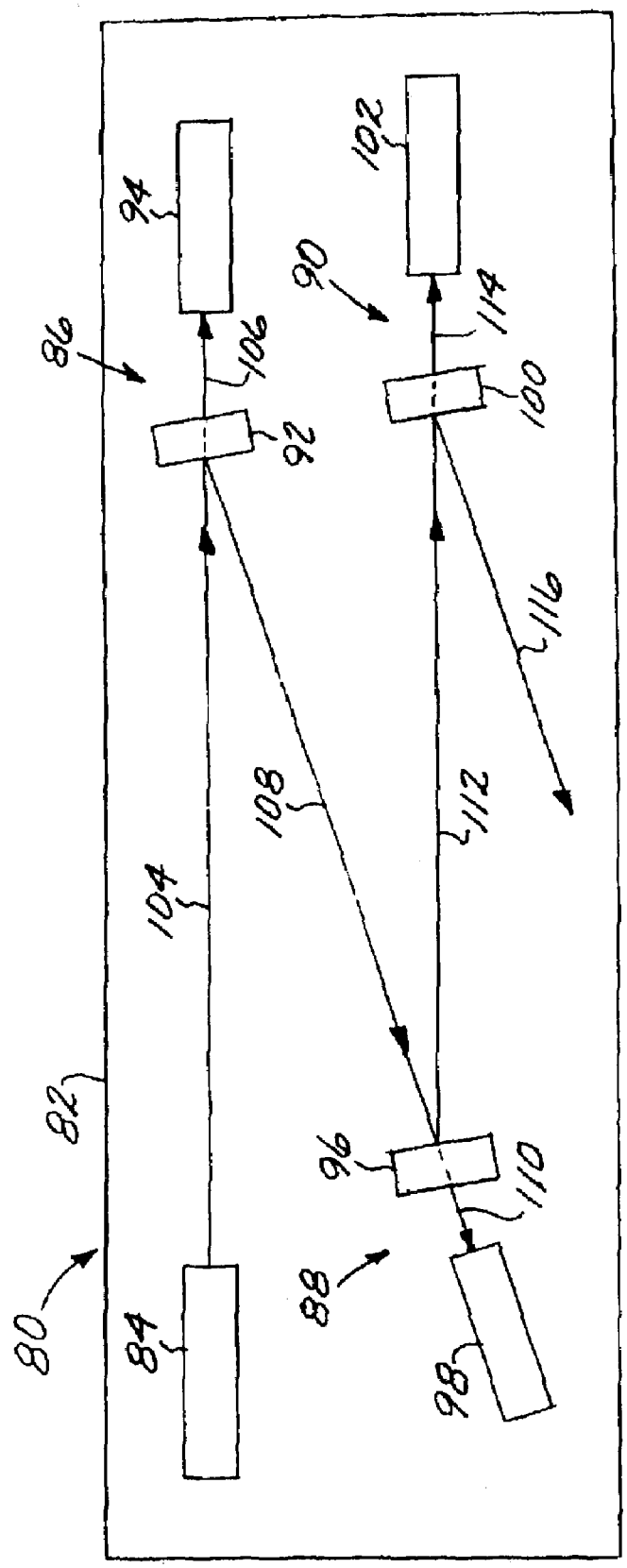
FIG. 4 is a schematic view of an optical multiplexer/demultiplexer apparatus.

FIG. 3 depicts a preferred approach for practicing the invention, and FIG. 4 depict an optical multiplexer/demultiplexer apparatus 80 that may be assembled by the present approach. The following discussion presents the alignment process in terms of a demultiplexer application of the multiplexer/demultiplexer apparatus 80, but the identical apparatus is used for multiplexer applications by passing the light beams in the directions opposite to the light paths shown in FIG. 4. That is, the multiplexer/demultiplexer apparatus 80, once aligned, may be used either for demultiplexer or multiplexer applications.

A set of components is furnished, step 40. The component set includes all of the necessary components of the optical multiplexer/demultiplexer apparatus 80. In the present illustration, the optical multiplexer/demultiplexer apparatus 80 includes a support base 82 to which the remaining components are ultimately affixed, an input collimator 84, and three multiplexer/demultiplexer stages 86, 88, and 90. There may be additional multiplexer/demultiplexer stages as needed. The first multiplexer/demultiplexer stage 86 includes a first thin-film optical filter 92 and a first transmitted-light collimator 94. The second multiplexer/demultiplexer stage 88 includes a second thin-film optical filter 96 and a second transmitted-light collimator 98. The third multiplexer/demultiplexer stage 90 includes a third thin-film optical filter 100 and a third transmitted-light collimator 102.

The input collimator 84, which provides the first incident light beam passes therethrough to provide the standard to which the other components are aligned, is fixed to the support base 82 by any operable approach, step 42. The support base 82 may be a flat plate, or it may be a structure with optical mounts. All of the fixing steps herein may be performed by any operable approach, such as an ultraviolet-curing adhesive or laser welding. The component may be fixed directly to the base, as with the adhesive, or mounted to an intermediate support which is then affixed to the base, as in laser welding.

The first multiplexer/demultiplexer stage 86 is aligned, step 44, by locating the first thin-film optical filter 92, step 46, so that a first incident light beam 104 from the incident collimator 84 is incident upon the first thin-film optical filter 92. (In FIG. 3, the term "thin-film optical filter" is abbreviated as TFOF.) As used herein "locating" the thin-film optical filter means displacing the position of the thin-film optical filter along any or all of three orthogonal axes so that the light beam incident upon the thin-film optical filter matches (falls within) the clear aperture of the thin-film optical filter. Usually, only a portion of the thin-film optical filter transmits the proper wavelength with a low insertion loss, this portion being termed the clear aperture or optically active area of the thin-film optical filter. The thin-film optical filter is displaced in three axes until the incident light beam falls within this clear aperture.

The first thin-film optical filter 92 is angularly oriented, step 48, to produce a first angle-of-incidence of the first incident light beam 104 on the first thin-film optical filter 92. As used herein "orienting" a thin-film optical filter means angularly rotating the thin-film optical filter about any of three orthogonal axes to achieve the required angle-of-incidence for the desired wavelength of light. This first angle-of-incidence is selected so that a desired first-transmitted light beam 106 (i.e., the desired center wavelength for that particular multiplexer/demultiplexer stage) is transmitted therethrough with a maximum intensity, and a second incident light beam 108 is reflected from the first thin-film optical filter 92. The first thin-film optical filter 92 is thereafter fixed to the support base 82, step 50, in the location and orientation previously established in steps 46 and 48.

The first transmitted-light collimator 94 is thereafter positioned to receive the first transmitted light beam 106 with minimal insertion loss, step 52. As used herein, "positioning" a transmitted-light collimator means to displace and/or rotate the collimator so that the light beam incoming to the collimator is along the optical axis of the collimator and focuses exactly on the optical fiber tip to provide maximum coupling efficiency and minimum insertion loss. The first transmitted light beam 106 is thereby separated from the first incident light beam 104 by the first thin-film optical filter 92, and received by the first transmitted-light collimator 94. Thereafter, the first transmitted-light collimator 94 is fixed to the support base 82, step 54, in the position previously established in step 52.

Thereafter, the second multiplexer/demultiplexer stage 88 is aligned, step 56, by locating the second thin-film optical filter 96, step 58, so that the second incident light beam 108, previously reflected from the first thin-film optical filter 92, is incident upon the second thin-film optical filter 96. The second thin-film optical filter 96 is angularly oriented, step 60, to produce a second angle-of-incidence of the second incident light beam 108 on the second thin-film optical filter 96. This second angle-of-incidence is selected so that a desired second transmitted-light beam 110 (i.e., the desired center wavelength for that particular multiplexer/demultiplexer stage) is transmitted therethrough with a maximum intensity, and a third incident light beam 112 is reflected from the second thin-film optical filter 96. The second thin-film optical filter 96 is thereafter fixed to the support base 82, step 62, in the location and orientation previously established in steps 58 and 60. The second transmitted-light collimator 98 is positioned to receive the second transmitted-light beam 110 with minimal insertion loss, step 64. The second transmitted light beam 110 is thereby separated from the second incident light beam 108 by the second thin-film optical filter 96, and received by the second transmitted-light collimator 98. Thereafter, the second transmitted-light collimator 98 is fixed to the support base 82, step 66, in the position previously established in step 64.

Thereafter, the third multiplexer/demultiplexer stage 90 is aligned, step 68, by locating the third thin-film optical filter 100, step 70, so that the third incident light beam 112, previously reflected from the second thin-film optical filter 96, is incident upon the third thin-film optical filter 100. The third thin-film optical filter 100 is angularly oriented, step 72, to produce a third angle-of-incidence of the third incident light beam 112 on the third thin-film optical filter 100. This third angle-of-incidence is selected so that a desired third transmitted-light beam 114 (i.e., the desired center wavelength for that particular multiplexer/demultiplexer stage) is transmitted therethrough with a maximum intensity, and a fourth incident light beam 116 is reflected from the third thin-film optical filter 100. The third thin-film optical filter 100 is thereafter fixed to the support base 82, step 74, in the location and orientation previously established in steps 70 and 72. The third transmitted-light collimator 102 is positioned to receive the third transmitted-light beam 114 with minimal insertion loss, step 76. The third transmitted light beam 114 is thereby separated from the third incident light beam 112 by the third thin-film optical filter 100, and received by the third transmitted-light collimator 102. Thereafter, the third transmitted-light collimator 102 is fixed to the support base 82, step 78, in the position previously established in step 76.

If there are additional multiplexer/demultiplexer stages, they are aligned sequentially in order following this same general approach. ("Sequential" refers to the order in which the light beam passing through the apparatus is incident upon the mux-demux stages and their respective thin-film optical filters. The first mux/demux stage contains the thin-film optical filter first encountered by the light beam, the second mux/demux stage contains the thin-film optical filter second encountered by the light beam after passing through the first mux/demux stage, and so on.) As a result, all of the multiplexer/demultiplexer stages are aligned to the original first incident light beam 104 and with optimized, tuned locations and orientations of the thin-film optical filters and collimators. By this approach, manufacturing variations in the components from ideal values are accommodated.

In each case, the respective positioning step of the transmitted-light optical collimator for any particular multiplexer/demultiplexer stage is performed after the orienting step of the thin-film optical filter. Within this constraint, there are a number of acceptable alignment variations. For example, the orienting steps 48, 60, and 72 for the thin-film optical filters may all be performed prior to the positioning steps 50, 62, and 74 of the transmitted light optical collimators. In another example, the orienting step and the positioning step for each multiplexer/demultiplexer stage may be completed prior to performing those same steps for the next multiplexer/demultiplexer stage.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for assembling an optical multiplexer/demultiplexer apparatus, comprising the steps of
    furnishing a component set comprising
        a base
        an input collimator
        a first thin-film optical tilter and a second thin-film optical filter, and
        a first transmitted-light collimator and a second transmitted light collimator;
    orienting the thin-film optical filters by the steps of
        fixing said input collimator to the base
        first locating the first thin-film optical filter so that a first incident light beam from said input collimator is incident upon the first thin-film optical filter, thereafter
        first orienting the first thin-film optical filter to produce a first angle-of-incidence of the first incident light beam on the first thin-film optical filter so that a desired first-transmitted light beam is transmitted therethrough with a maximum intensity and a second incident light beam is reflected from the first thin-film optical filter, thereafter
        second locating the second thin-film optical filter so that the second incident light beam is incident upon the second thin-film optical tilter, and thereafter
        second orienting the second thin-film optical filter to produce a second angle-of-incidence of the second incident light beam on the second thin-film optical filter so that a desired second-transmitted light beam is transmitted therethrough with a maximum intensity and a third incident light beam is reflected from the second thin-film optical filter; and positioning the transmitted-light collimators by the steps of
    first positioning the first transmitted-light collimator to receive the first-transmitted light beam with minimal insertion loss, wherein the step of first positioning is performed independently of, but after, the step of first orienting, and
    second positioning the second transmitted-light collimator to receive the second-transmitted light beam with minimal insertion loss, wherein the step of second positioning is performed independently of, but after, the step of second orienting.

2. The method of claim 1, wherein the method includes the additional steps of
    fixing the first thin-film optical filter in place, performed after the step of first orienting,
    fixing the first transmitted-light collimator in place, performed after the step of first positioning,
    fixing the second thin-film optical filter in place, performed after the step of second orienting, and
    fixing the second transmitted-light collimator in place, performed after the step of second positioning.

3. The method of claim 2,
    wherein the steps of fixing include the step of fixing the first thin-film optical filter, the first transmitted-light collimator, the second thin-film optical filter, and the second transmitted-light collimator to the support base.

4. The method of claim 1,
    wherein the method includes an additional step of directing the first incident light beam through the input collimator.

5. The method of claim 1, wherein the step of first positioning is performed after the step of first orienting but before the step of second orienting.

6. The method of claim 1, wherein the step of first positioning is performed after the step of first orienting and after the step of second orienting.

7. The method of claim 1, wherein the step of furnishing the component set includes the step of
    furnishing the component set additionally comprising
        a third thin-film optical filter, and
        a third transmitted-light collimator, and
    orienting the third thin-film optical filter by the steps of
        third locating the third thin-film optical filter so that the third incident light beam is incident upon the third thin-film optical filter, and thereafter
        third orienting the third thin-film optical filter to produce a third angle-of-incidence of the third incident light beam on the third thin-film optical filter so that a desired third-transmitted light beam is transmitted therethrough with a maximum intensity and a fourth incident light beam is reflected from the third thin-film optical filter, thereafter
    positioning the third transmitted-light collimator by the steps of
        third positioning the third transmitted-light collimator to receive the third-transmitted light beam with minimal insertion loss, wherein the step of third positioning is performed independently of, but after, the step of third orienting.

8. The method of claim 7, wherein the step of aligning the third multiplexer/demultiplexer stage includes additional steps of
    fixing the third thin-film optical filter in place, performed after the step of third orienting, and
    fixing the third transmitted-light collimator in place, performed after the step of third positioning.

9. A method for assembling an optical multiplexer/demultiplexer apparatus, comprising the steps of furnishing a component set comprising a base, an input collimator and at least two multiplexer/demultiplexer stages whose components are to be oriented and positioned in sequence, wherein each multiplexer/demultiplexer stage includes a respective thin-tilm optical filter and a respective transmitted-light collimator;
    orienting the thin-film optical filters by the steps of
        fixing the input collimator to the base
        respectively locating each thin-film optical filter so that an incident light beam from the input collimator is incident upon and reflected sequentially from each thin-film optical filter to the next thin-film optical filter, thereafter
        respectively orienting each thin-film optical tilter to produce a respective angle-of-incidence of the incident light beam on the thin-film optical filter so that a desired transmitted light beam is transmitted therethrough with a maximum intensity; and positioning the transmitted-light collimators by the steps of respectively positioning each respective transmitted-light collimator to receive the respective transmitted light beam with minimal insertion loss, wherein the respective step of positioning is performed independently of, but after, the respective step of orienting for each multiplexer/demultiplexer stage.

10. The method of claim 9, wherein the method includes the additional steps of respectively fixing the thin-film optical filters in place, performed after the step of respectively orienting, and respectively fixing the transmitted-light collimators in place, performed after the step of respectively orienting.

11. The method of claim 10, wherein the steps of respectively fixing include the step of fixing the thin-film optical filters and the transmitted-light collimators to the support base.

12. The method of claim 9, wherein the method includes an additional step of directing a first incident light beam through the input collimator to a first multiplexer/demultiplexer stage.

13. The method of claim 9, wherein the steps of respectively locating and respectively orienting for each multiplexer/demultiplexer stage are completed prior to performing the steps of respectively orienting and respectively positioning for the next sequential multiplexer/demultiplexer stage.

14. A method for assembling an optical multiplexer/demultiplexer apparatus, comprising the steps of furnishing a component set comprising a base, an input collimator and at least two multiplexer/demultiplexer stages whose components are to be oriented and positioned in sequence, wherein each multiplexer/demultiplexer stage includes a thin-film optical filter and a transmitted-light collimator, and sequentially aligning the multiplexer/demultiplexer stages, wherein the step of sequentially aligning includes the step of fixing the input collimator to the base, the step of aligning the thin-film optical filter and the transmitted-light collimator of each multiplexer/demultiplexer stage to achieve a maximum intensity of a transmitted light beam of a desired wavelength as received by the transmitted-light collimator, wherein the orientation of the thin-tilm optical filter and the position of the optical collimator are varied responsive to a property of the thin-film optical filter.

15. The method of claim 14, wherein the method includes the additional steps of respectively fixing the thin-film optical filters in place, performed after the step of respectively orienting, and respectively fixing the transmitted-light collimators in place, performed after the step of respectively orienting.

16. The method of claim 15, wherein the steps of respectively fixing include the step of fixing the thin-film optical filters and the transmitted-light collimators to the support base.

17. The method of claim 14, wherein the method includes an additional step of directing a first incident light beam through the input collimator to a first multiplexer/demultiplexer stage.

* * * * *